(12) United States Patent
Gelman et al.

(10) Patent No.: US 7,917,790 B2
(45) Date of Patent: Mar. 29, 2011

(54) SEPARATE POWER ISLAND FOR HIGH PERFORMANCE PROCESSOR THAT REBOOTS TO SECOND BOOT SECTOR

(75) Inventors: Anatoly Gelman, San Diego, CA (US); Kiran Puttegowda, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 717 days.

(21) Appl. No.: 12/015,681

(22) Filed: Jan. 17, 2008

(65) Prior Publication Data

US 2009/0187753 A1    Jul. 23, 2009

(51) Int. Cl.
*G06F 1/32*    (2006.01)
(52) U.S. Cl. ............. 713/323; 455/574; 713/2; 713/320
(58) Field of Classification Search .................. 455/574; 713/2, 320, 323
See application file for complete search history.

(56) References Cited

U.S. PATENT DOCUMENTS

| 7,085,943 B2 * | 8/2006 | Chun et al. ..................... 713/300 |
| 7,383,431 B2 * | 6/2008 | Takamizawa et al. ............ 713/2 |
| 7,475,184 B2 * | 1/2009 | Lee ............................... 711/103 |

* cited by examiner

*Primary Examiner* — Albert Wang
(74) *Attorney, Agent, or Firm* — Garlick Harrison & Markison; Shayne X. Short

(57) ABSTRACT

Separate power island for high performance processor. A multi-processor design is presented in which each of the processors is implemented in separately powered portions of a circuitry (e.g., an integrated circuit). One of the processors can be a main application processor, and another of the processors can be a baseband processor. In addition, the each of the processors can be implemented using different types of circuitry (e.g., one of the processors [such as the main application processor] is implemented using higher performance/higher leakage circuitry that another of the processors [such as the baseband processor]). One of the processors (e.g., main application processor) can be powered down when not needed thereby providing energy/power conservation which can be vital is handheld communication device applications such as wireless handheld communication devices.

20 Claims, 6 Drawing Sheets

SEPARATE POWER ISLAND FOR HIGH PERFORMANCE PROCESSOR THAT REBOOTS TO SECOND BOOT SECTOR

BACKGROUND OF THE INVENTION

1. Technical Field of the Invention

The invention relates generally to communication systems; and, more particularly, it relates to power management as may be performed within communication devices employed within such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera, communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

While transmitters generally include a data modulation stage, one or more IF stages, and a power amplifier, the particular implementation of these elements is dependent upon the data modulation scheme of the standard being supported by the transceiver. For example, if the baseband modulation scheme is Gaussian Minimum Shift Keying (GMSK), the data modulation stage functions to convert digital words into quadrature modulation symbols, which have a constant amplitude and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with a transmit power level setting to produce a phase modulated RF signal.

As another example, if the data modulation scheme is 8-PSK (phase shift keying), the data modulation stage functions to convert digital words into symbols having varying amplitudes and varying phases. The IF stage includes a phase locked loop (PLL) that generates an oscillation at a desired RF frequency, which is modulated based on the varying phases produced by the data modulation stage. The phase modulated RF signal is then amplified by the power amplifier in accordance with the varying amplitudes to produce a phase and amplitude modulated RF signal.

As yet another example, if the data modulation scheme is x-QAM (16, 64, 128, 256 quadrature amplitude modulation), the data modulation stage functions to convert digital words into Cartesian coordinate symbols (e.g., having an in-phase signal component and a quadrature signal component). The IF stage includes mixers that mix the in-phase signal component with an in-phase local oscillation and mix the quadrature signal component with a quadrature local oscillation to produce two mixed signals. The mixed signals are summed together and filtered to produce an RF signal that is subsequently amplified by a power amplifier.

As the desire for wireless communication devices to support multiple standards continues, recent trends include the desire to integrate more functions on to a single chip. However, such desires have gone unrealized when it comes to implementing baseband and RF on the same chip for multiple wireless communication standards. In addition, many components and/or modules within the components employed within such communication devices and wireless communication devices include many off-chip elements.

Within many communication devices, and particularly in handheld wireless communication devices, power and energy management can be of utmost importance. Moreover, the security and integrity of such a communication device is also of high importance. New and better means of performing power management as well as ensuring increased levels of security continue to be in demand within the wireless communication device markets.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
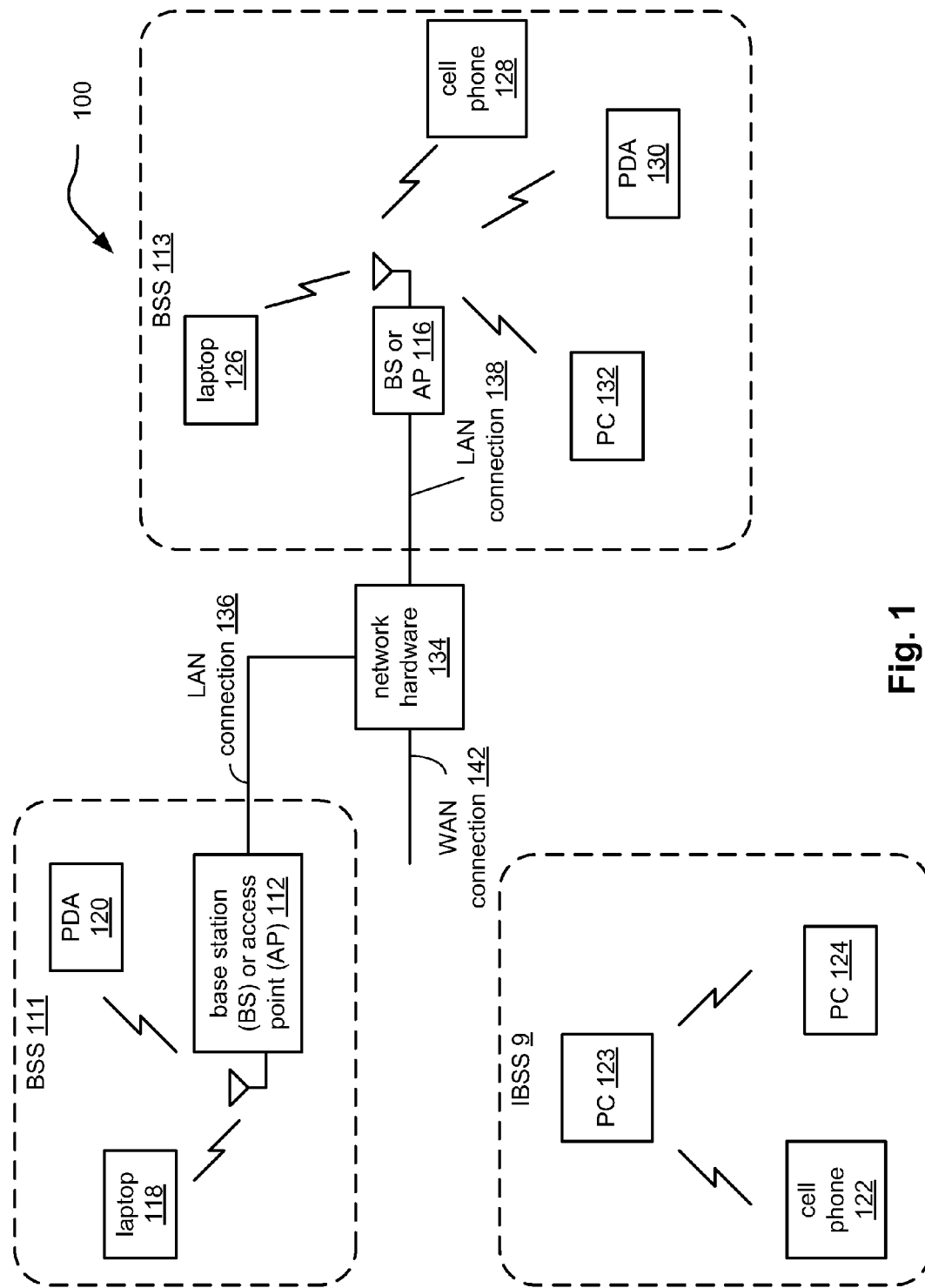
FIG. 1 is a diagram illustrating an embodiment of a wireless communication system.

A novel apparatus is presented herein that implements at least one processor on a power island of a multi-processor system or device. A first processor is implemented within the power island of an integrated circuit, and the power management of that power island is managed independently from the other portions of the integrated circuit. A second processor of the multi-processor device is implemented outside of the power island. During boot up of the integrated circuit, the first processor and the second processor are powered on and the first processor boots up from a first boot sector. However, after a period of time has passed (e.g., which can be a predetermined period of time or after the completion of a particular task or queue of tasks such as can be indicated within software), the first processor powers down, and the second processor remains powered and operational. Thereafter, in response to an interrupt request, the first processor is powered on and booted up from a second boot sector. Such an interrupt request can be an incoming call within a communication device application (e.g., a personal or handheld wireless communication device) that includes such a multi-processor implementation.

Each of the processors in such a multi-processor implementation can be of different grade such as with respect to performance, leakage, and/or other parameters. Also, each of the processors can be implemented for performing different functions. For example, one of the processors can be a main application processor, and another of the processors can be a baseband processor. A first of the processors (e.g., main application processor) can be of higher performance grade and implemented using higher leakage circuitry that another of the processors (e.g., the baseband processor). Alternatively, the higher performance processor may be the main processor for a multi-mode communication integrated circuit, and the second processor can be implemented to perform baseband communication processing.

In one embodiment, to take advantages of a high performance processor in a multi processor system while minimizing its power consumption, the high performance processor is placed in its own power island. The second processor employs the main processor to get started (e.g., booted up and running), but once the second processor is started and operational, then first processor (e.g., the main application processor) can be turned off. Just before the first processor turns off, several operational parameters can be saved for subsequent re-starting (e.g., endian, state, and/or other parameter). This can be saved by setting a register value, writing to memory or a boot sector, or other means within such an integrated circuit.

For example, with the main processor off, big-endian/little-endian is maintained for proper memory access by additional circuitry. When the main processor is activated (or re-activated), it does not perform a cold reboot, but a soft reboot to maintain the big-endian/little-endian format (e.g., the manner in which data is interpreted such as left to right, or right to left).

Moreover, the various boot sectors by which each of the first processor and the second processor are booted from (for each of cold and/or soft boots) can be different. For improved security, the first processor (or main application processor) can be booted from a first boot sector during cold boots in which multiple processors of the integrated circuit are booted. Then, during soft boots (e.g., re-activations after being powered down while other of the processors maintain operation), the first processor (or main application processor) can be booted from a second boot sector. The first boot sector can be cloaked after its use during a cold boot, such that it is a secure boot sector which cannot be accessed except during such a cold boot. Also, upon a detection of tampering with the integrated circuit (e.g., which can sometimes be indicated by a voltage fluctuation—a voltage attack), the first processor performs a power on reset which prevents any tampering with it. This power on reset (by shutting down the first processor) can provide a measure of protection to the first processor should an unauthorized part seek to meddle with it.

FIG. 1 is a diagram illustrating an embodiment of a wireless communication system 100. The wireless communication system 100 includes a plurality of base stations and/or access points 112, 116, a plurality of wireless communication devices 118-132 and a network hardware component 134. Note that the network hardware 134, which may be a router, switch, bridge, modem, system controller, et cetera, provides a wide area network connection 142 for the communication system 100. Further note that the wireless communication devices 118-132 may be laptop host computers 118 and 126, personal digital assistant hosts 120 and 130, personal computer hosts 124 and 132 and/or cellular telephone hosts 122 and 128.

Wireless communication devices 122, 123, and 124 are located within an independent basic service set (IBSS) area and communicate directly (i.e., point to point). In this configuration, these devices 122, 123, and 124 may only communicate with each other. To communicate with other wireless communication devices within the system 100 or to communicate outside of the system 100, the devices 122, 123, and/or 124 need to affiliate with one of the base stations or access points 112 or 116.

The base stations or access points 112, 116 are located within basic service set (BSS) areas 111 and 113, respectively, and are operably coupled to the network hardware 134 via local area network connections 136, 138. Such a connection provides the base station or access point 112-116 with connectivity to other devices within the system 100 and provides connectivity to other networks via the WAN connection 142. To communicate with the wireless communication devices within its BSS 111 or 113, each of the base stations or access points 112-116 has an associated antenna or antenna array. For instance, base station or access point 112 wirelessly communicates with wireless communication devices 118 and 120 while base station or access point 116 wirelessly communicates with wireless communication devices 126-132. Typically, the wireless communication devices register with a particular base station or access point 112, 116 to receive services from the communication system 100.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio.

Figure 2:
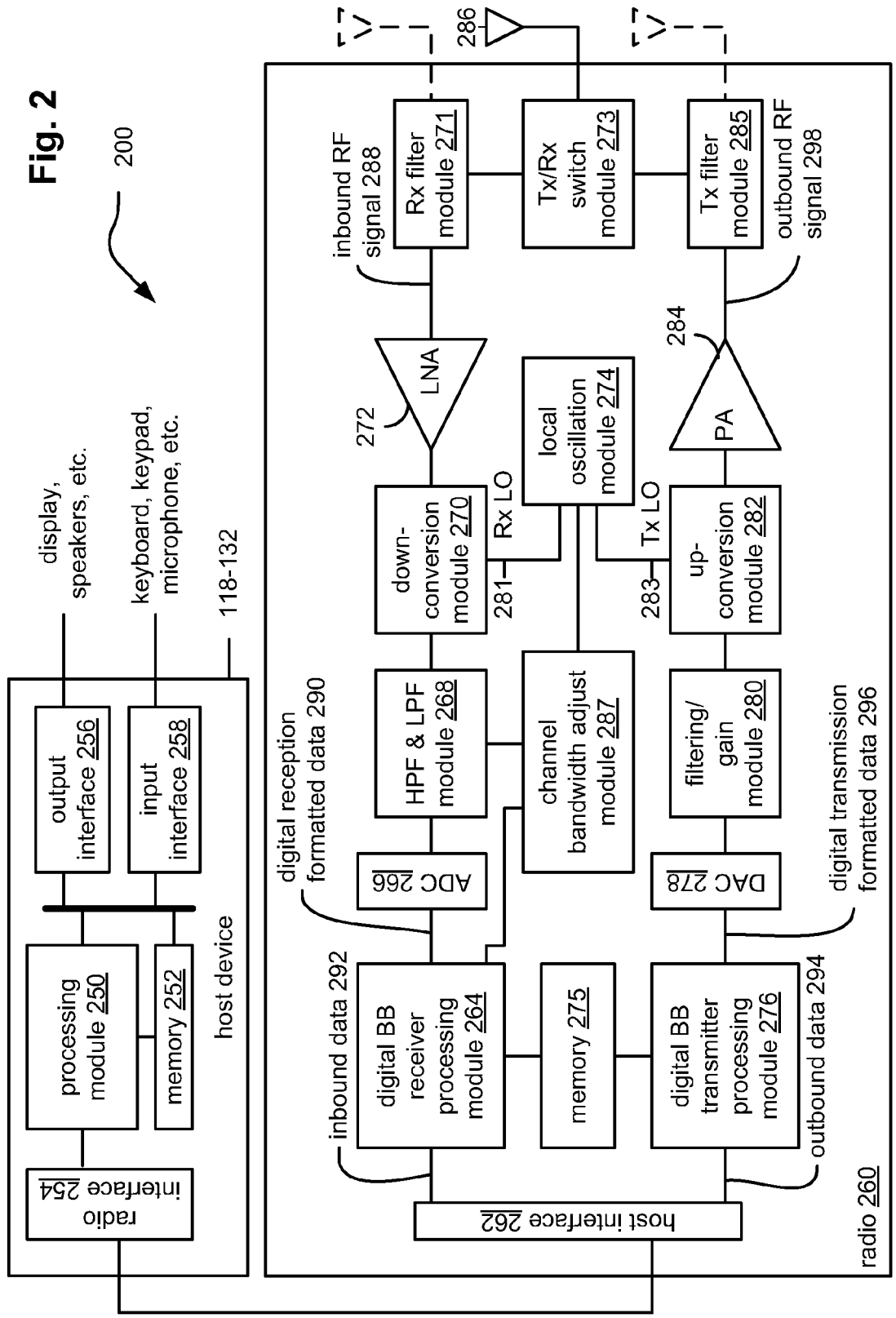
FIG. 2 is a diagram illustrating an embodiment of a wireless communication device.

FIG. 2 is a diagram illustrating an embodiment of a wireless communication device 200 that includes the host device 118-132 and an associated radio 260. For cellular telephone hosts, the radio 260 is a built-in component. For personal digital assistants hosts, laptop hosts, and/or personal computer hosts, the radio 260 may be built-in or an externally coupled component.

As illustrated, the host device 118-132 includes a processing module 250, memory 252, a radio interface 254, an input interface 258, and an output interface 256. The processing module 250 and memory 252 execute the corresponding instructions that are typically done by the host device. For example, for a cellular telephone host device, the processing module 250 performs the corresponding communication functions in accordance with a particular cellular telephone standard.

The radio interface 254 allows data to be received from and sent to the radio 260. For data received from the radio 260 (e.g., inbound data), the radio interface 254 provides the data to the processing module 250 for further processing and/or routing to the output interface 256. The output interface 256 provides connectivity to an output display device such as a display, monitor, speakers, et cetera, such that the received data may be displayed. The radio interface 254 also provides data from the processing module 250 to the radio 260. The processing module 250 may receive the outbound data from an input device such as a keyboard, keypad, microphone, et cetera, via the input interface 258 or generate the data itself. For data received via the input interface 258, the processing module 250 may perform a corresponding host function on the data and/or route it to the radio 260 via the radio interface 254.

Radio 260 includes a host interface 262, digital receiver processing module 264, an analog-to-digital converter 266, a high pass and low pass filter module 268, an IF mixing down conversion stage 270, a receiver filter 271, a low noise amplifier 272, a transmitter/receiver switch 273, a local oscillation module 274, memory 275, a digital transmitter processing module 276, a digital-to-analog converter 278, a filtering/gain module 280, an IF mixing up conversion stage 282, a power amplifier 284, a transmitter filter module 285, a channel bandwidth adjust module 287, and an antenna 286. The antenna 286 may be a single antenna that is shared by the transmit and receive paths as regulated by the Tx/Rx switch 273, or may include separate antennas for the transmit path and receive path. The antenna implementation will depend on the particular standard to which the wireless communication device 200 is compliant.

The digital receiver processing module 264 and the digital transmitter processing module 276, in combination with operational instructions stored in memory 275, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 264 and 276 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 275 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 264 and/or 276 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 260 receives outbound data 294 from the host device via the host interface 262. The host interface 262 routes the outbound data 294 to the digital transmitter processing module 276, which processes the outbound data 294 in accordance with a particular wireless communication standard (e.g., IEEE 802.11, Bluetooth, ZigBee, any other type of radio frequency based network protocol and/or variations thereof et cetera) to produce outbound baseband signals 296. The outbound baseband signals 296 will be digital base-band signals (e.g., have a zero IF) or digital low IF signals, where the low IF typically will be in the frequency range of one hundred kHz (kilo-Hertz) to a few MHz (Mega-Hertz).

The digital-to-analog converter 278 converts the outbound baseband signals 296 from the digital domain to the analog domain. The filtering/gain module 280 filters and/or adjusts the gain of the analog signals prior to providing it to the IF mixing stage 282. The IF mixing stage 282 converts the analog baseband or low IF signals into RF signals based on a transmitter local oscillation 283 provided by local oscillation module 274. The power amplifier 284 amplifies the RF signals to produce outbound RF signals 298, which are filtered by the transmitter filter module 285. The antenna 286 transmits the outbound RF signals 298 to a targeted device such as a base station, an access point and/or another wireless communication device 200.

The radio 260 also receives inbound RF signals 288 via the antenna 286, which were transmitted by a base station, an access point, or another wireless communication device. The antenna 286 provides the inbound RF signals 288 to the receiver filter module 271 via the Tx/Rx switch 273, where the Rx filter 271 bandpass filters the inbound RF signals 288. The Rx filter 271 provides the filtered RF signals to low noise amplifier 272, which amplifies the signals 288 to produce an amplified inbound RF signals. The low noise amplifier 272 provides the amplified inbound RF signals to the IF mixing module 270, which directly converts the amplified inbound RF signals into an inbound low IF signals or baseband signals based on a receiver local oscillation 281 provided by local oscillation module 274. The down conversion module 270 provides the inbound low IF signals or baseband signals to the filtering/gain module 268. The high pass and low pass filter module 268 filters, based on settings provided by the channel bandwidth adjust module 287, the inbound low IF signals or the inbound baseband signals to produce filtered inbound signals.

The analog-to-digital converter 266 converts the filtered inbound signals from the analog domain to the digital domain to produce inbound baseband signals 290, where the inbound baseband signals 290 will be digital base-band signals or digital low IF signals, where the low IF typically will be in the frequency range of one hundred kHz to a few MHz. The digital receiver processing module 264, based on settings provided by the channel bandwidth adjust module 287, decodes, descrambles, demaps, and/or demodulates the inbound baseband signals 290 to recapture inbound data 292 in accordance with the particular wireless communication standard being implemented by radio 260. The host interface 262 provides the recaptured inbound data 292 to the host device 118-132 via the radio interface 254.

As one of average skill in the art will appreciate, the wireless communication device 200 of FIG. 2 may be implemented using one or more integrated circuits. For example, the host device may be implemented on one integrated circuit, the digital receiver processing module 264, the digital transmitter processing module 276 and memory 275 may be implemented on a second integrated circuit, and the remaining components of the radio 260, less the antenna 286, may be implemented on a third integrated circuit. As an alternate example, the radio 260 may be implemented on a single integrated circuit. As yet another example, the processing module 250 of the host device and the digital receiver and transmitter processing modules 264 and 276 may be a common processing device implemented on a single integrated circuit. Further, the memory 252 and memory 275 may be implemented on a single integrated circuit and/or on the same integrated circuit as the common processing modules of processing module 250 and the digital receiver and transmitter processing module 264 and 276.

Figure 3:
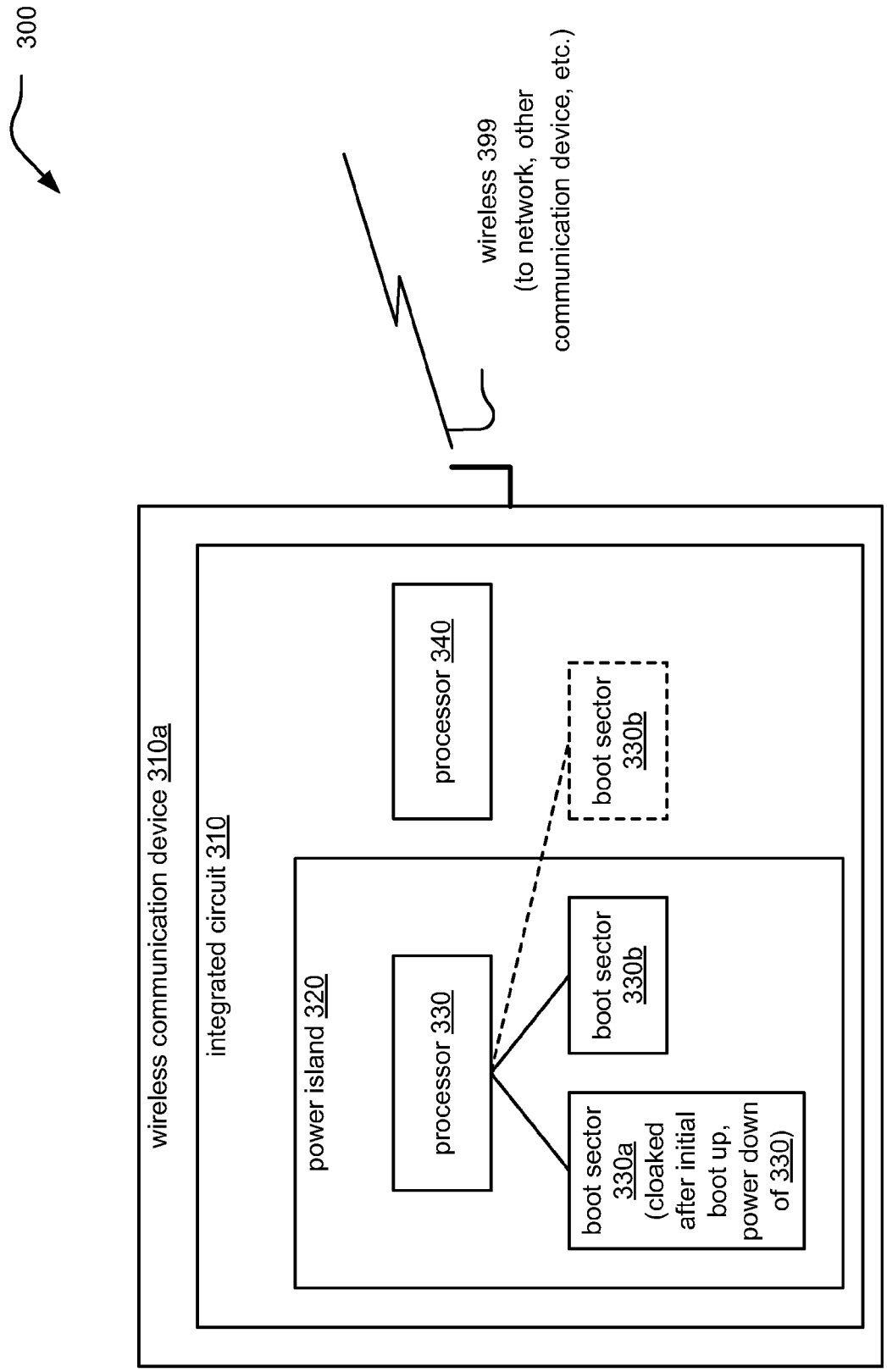
FIG. 3 is a diagram illustrating an embodiment of a wireless communication system including a wireless communication device that has an internal, separate power island including at least one processor.

FIG. 3 is a diagram illustrating an embodiment of a wireless communication system 300 including a wireless communication device 310*a* that has an internal, separate power island 320 including at least one processor. The wireless communication device 310*a* includes an integrated circuit 310 that itself includes a processor 300 and a processor 340. The wireless communication device 300 can communicate via a wireless communication channel 399 to a communication network and/or one or more other communication devices. The processor 330 is implemented within a power island 320 of the integrated circuit 310. The power management of the power island 320 is independent from portions of the integrated circuit 310 outside of the power island 320. The processor 340 is implemented outside of the power island 320 of the integrated circuit 310.

During boot up of the integrated circuit 310, the processor 330 and the second processor 340 are powered on and the processor 330 boots up from a boot sector 330*a*. After a period of time has passed (e.g., such as completion of a task or queue of tasks as may be indicated within software of the device), the processor 330 powers down, and the processor 340 remains powered and operational. In response to an interrupt request (e.g., such as may be the receipt of an incoming call, the pushing of a button of the wireless communication device 310*a*, etc.), the processor 330 is powered on and booted up from a boot sector 330*b* or a boot sector 330*c*. The processor 330 then can service the interrupt once re-activated.

The boot sector 330*a* can be secured and/or cloaked after it use in the initial cold boot of the integrated circuit 310. This can ensure that the original boot sector 330*a* employed during initial booting of the processor 330 can be protected from voltage attack such as when an unauthorized party tampers with the voltage to try to gain access to the processor 330. Also, various operational parameters of the processor 330 can be provided to a register, memory and/or boot sector 330*b* implemented within the power island 320 before the processor 330 is powered down or to a register, memory or boot sector 330*c* implemented outside the power island 320 before the processor 330 is powered down. This can ensure that the processor 300, when re-activated or re-booted, does a soft re-boot (e.g., not a full/cold boot) based on the information that was stored just before the processor 300 powers down (e.g., in boot sector 330*b* or boot sector 330*c*). These various saved operational parameters can be the state of the processor 330, the big-endian/little-endian by which data is being interpreted and is to be interpreted upon the re-activation of the processor 330 (and/or manner by which data is moved within the processor 330 to/from the processor 330 to an external memory, network, etc.), and/or any other operational parameter or parameters as well without departing from the scope and spirit of the invention.

Figure 4:
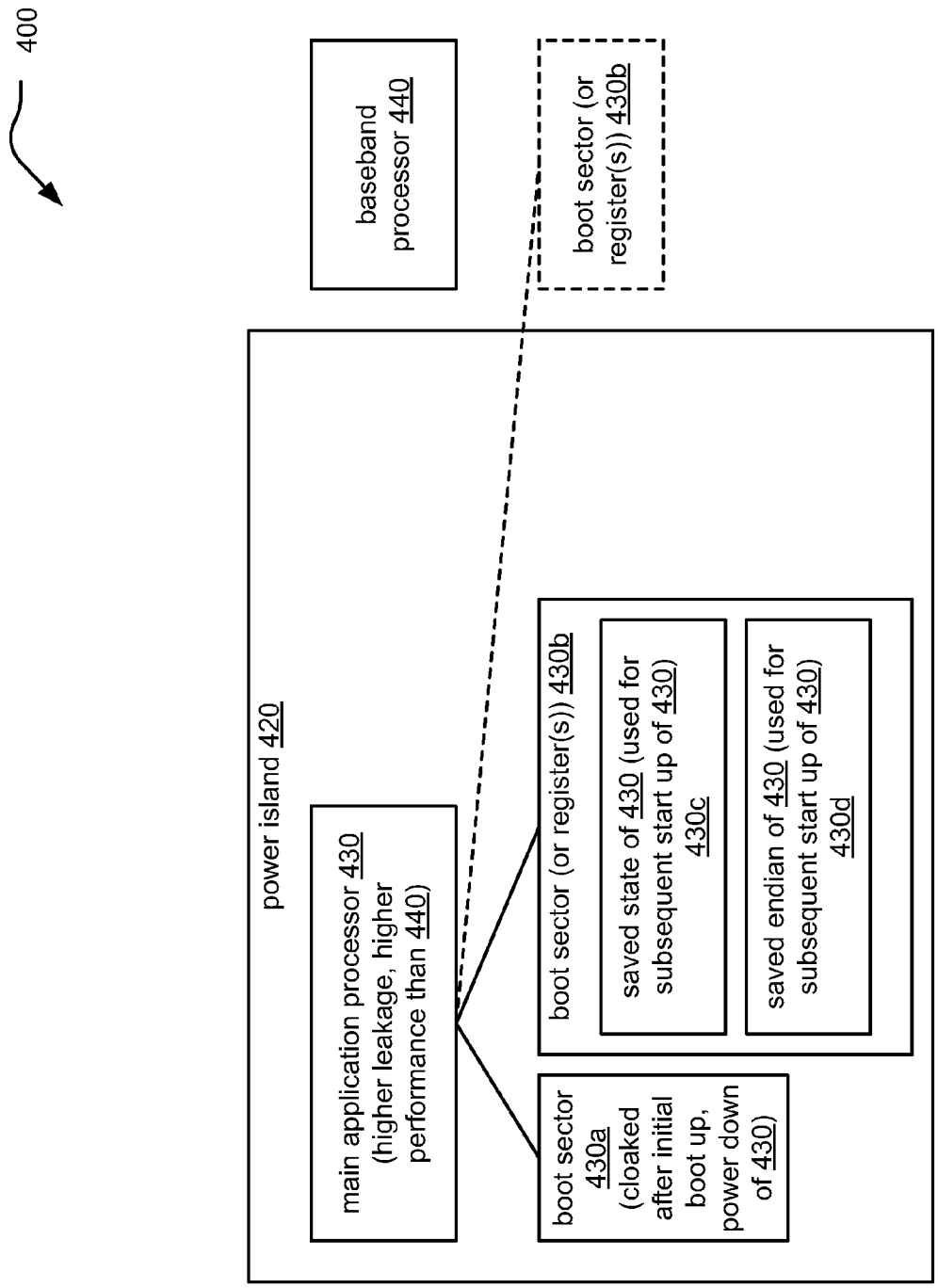
FIG. 4 is a diagram illustrating an embodiment of an integrated circuit that includes a separate power island for at least one processor.

FIG. 4 is a diagram illustrating an embodiment of an integrated circuit 400 that includes a separate power island for at least one processor. Somewhat analogous to the previous embodiment, this embodiment includes a power island 420 on which a first processor (shown as main application processor 430) is implemented. The integrated circuit 400 also includes a second processor (shown as baseband processor 440) that is implemented outside of the power island 420 of the integrated circuit 400.

The main application processor 430 is implemented using circuitry having relatively higher leakage and relatively higher performance capabilities that the baseband processor 440. The main application processor 430 can operate faster than the baseband processor 440.

During boot up of the integrated circuit 400, the main application processor 430 and the baseband processor 440 are powered on and the main application processor 430 boots up from a boot sector 430*a*. After a period of time has passed (e.g., such as completion of a task or queue of tasks as may be indicated within software of the device), the main application processor 430 powers down, and the baseband processor 440 remains powered and operational. In response to an interrupt request (e.g., such as may be the receipt of an incoming call, the pushing of a button of a wireless communication device that may include the integrated circuit 400, etc.), the main application processor 430 is powered on and booted up from a boot sector 430*b* or boot sector 430*c*. The processor 430 then can service the interrupt once re-activated.

The boot sector 430*a* can be secured and/or cloaked after it use in the initial cold boot of the integrated circuit 400. This can ensure that the original boot sector 430*a* employed during initial booting of the main application processor 430 can be protected from voltage attack such as when an unauthorized party tampers with the voltage to try to gain access to the main application processor 430. Also, various operational parameters of the main application processor 430 can be provided to a register, memory or boot sector 430b implemented within the power island 420 before the main application processor 430 is powered down or to a register, memory, and/or boot sector 430c implemented outside the power island 420 before the main application processor 430 is powered down.

This can ensure that the main application processor 430, when re-activated or re-booted, does a soft re-boot (e.g., not a full/cold boot) based on the information that was stored just before the main application processor 430 powers down (e.g., in boot sector 430b or boot sector 430c). These various saved operational parameters can be the state of the main application processor 430 as indicated by the reference numeral 430c, the big-endian/little-endian by which data is being interpreted and is to be interpreted upon the re-activation of the main application processor 430 (and/or manner by which data is moved within the main application processor 430 to to/from the main application processor 430 to an external memory, network, etc.) as indicated by the reference numeral 430d, and/or any other operational parameter or parameters as well without departing from the scope and spirit of the invention.

Figure 5:
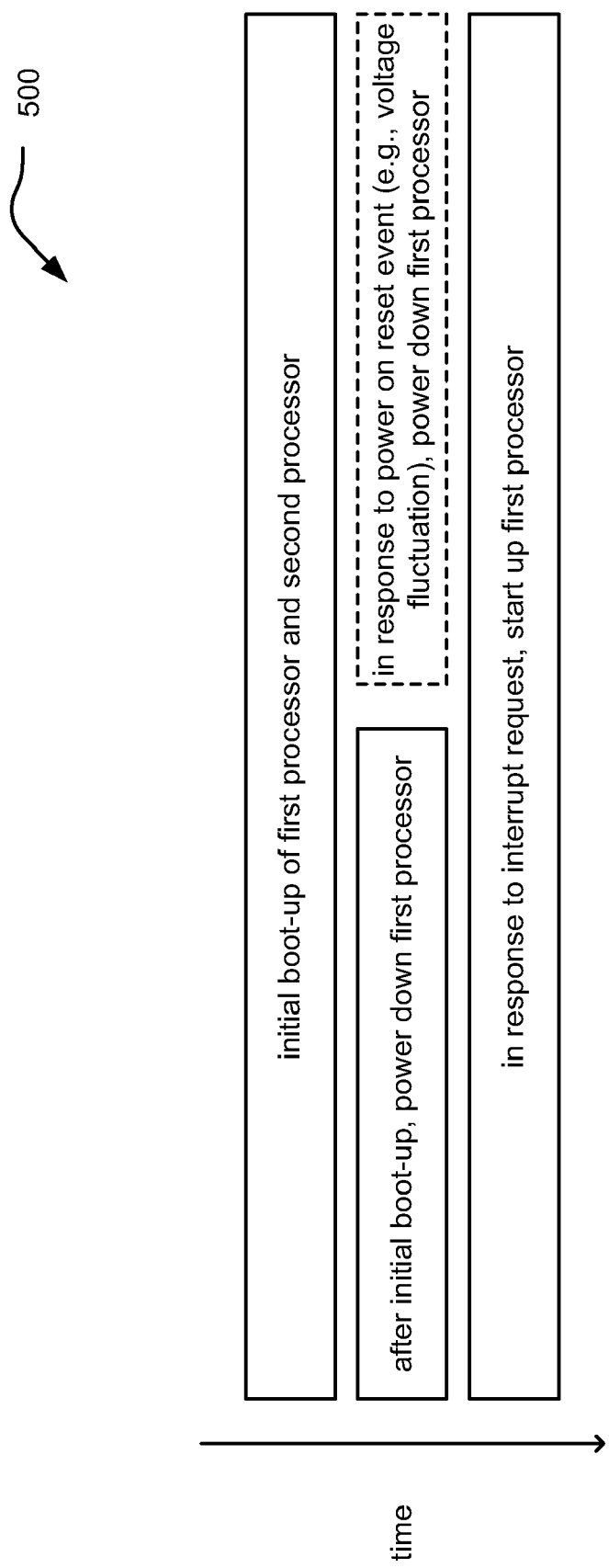
FIG. 5 is a diagram illustrating an embodiment of operational flow, in terms of time, of operating multiple processors such that at least one processor is implemented on its own separate power island.

FIG. 5 is a diagram illustrating an embodiment of operational flow 500, in terms of time, of operating multiple processors such that at least one processor is implemented on its own separate power island.

Initially, an initial boot-up is performed of a first processor and a second processor. Then, after the initial boot-up is completed, the first processor powers down. Also, even during operation of the first processor, upon the detection of a reset event (e.g., a voltage fluctuation such as can be experienced during a voltage attack), a power on reset is performed in which the first processor powers down. Thereafter, in response to an interrupt request, the first processor starts up again.

Figure 6:
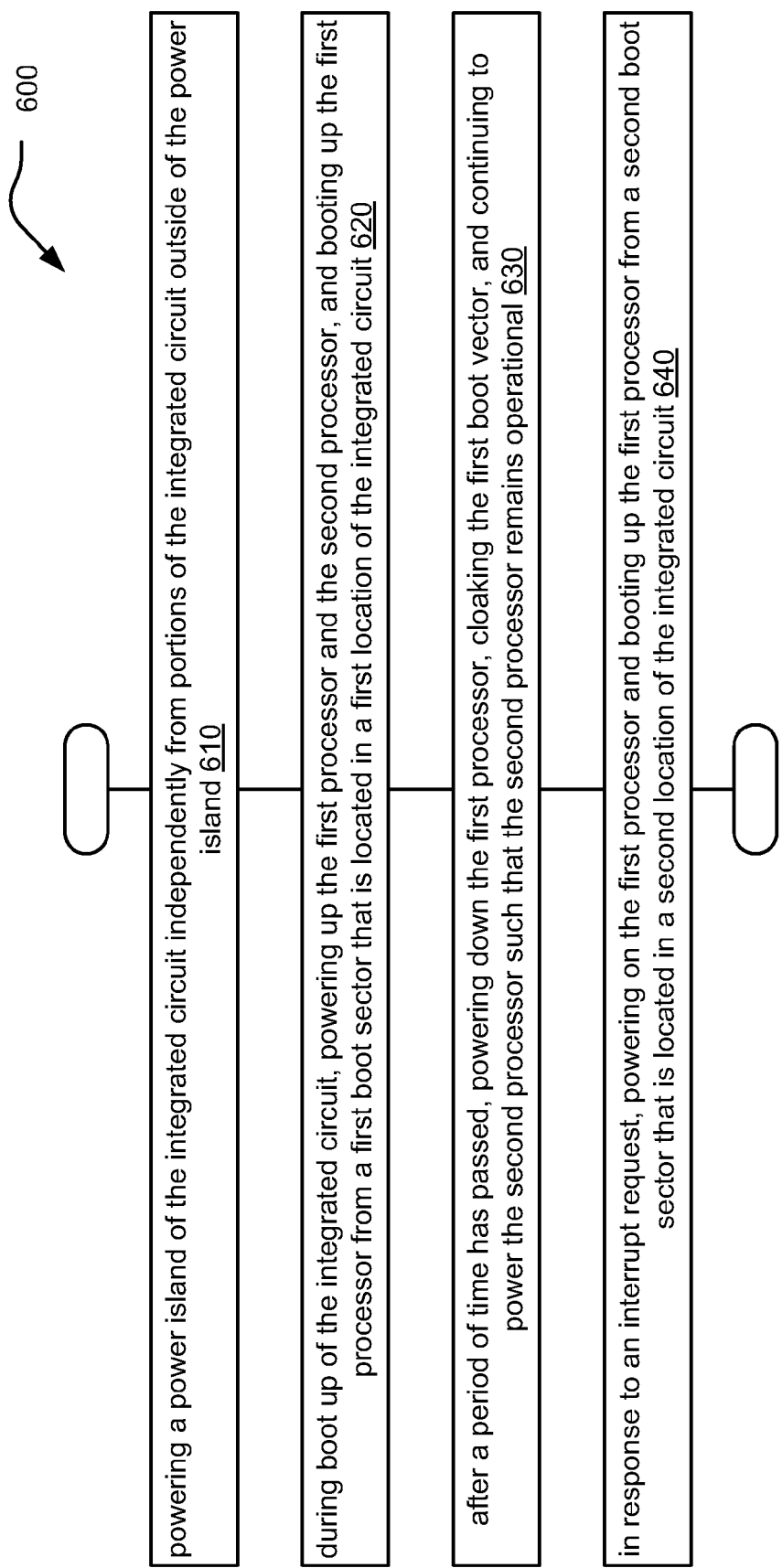
FIG. 6 is a diagram illustrating an embodiment of a method for performing power management within an integrated circuit.

FIG. 6 is a diagram illustrating an embodiment of a method 600 for performing power management within an integrated circuit. The method 600 begins by powering a power island of the integrated circuit independently from portions of the integrated circuit outside of the power island, as shown in a block 610. In certain embodiments, the power island includes a first processor, the integrated circuit includes a second processor implemented outside of the power island of the integrated circuit, and the first processor is implemented using circuitry having higher leakage than circuitry with which the second processor is implemented.

Then, during boot up of the integrated circuit, the method 600 continues by powering up the first processor and the second processor, and booting up the first processor from a first boot sector that is located in a first location of the integrated circuit, as shown in a block 620.

After a period of time has passed, the method 600 continues by powering down the first processor, cloaking the first boot sector, and continuing to power the second processor such that the second processor remains operational, as shown in a block 630. In response to an interrupt request, the method 600 operates by powering on the first processor and booting up the first processor from a second boot sector that is located in a second location of the integrated circuit, as shown in a block 640.

In alternative embodiments, before powering down the first processor, various operational parameters of the first processor (e.g., state, endian, etc.) can be stored so that those operational parameters can be employed by the first processor upon a soft boot thereof.

Moreover, based on a fluctuation of voltage that powers the power island (and the first processor), an alternative method can also perform a power on reset of the power island of the integrated circuit to shut down the first processor to ensure no tampering may be made with it.

It is noted that the various modules (e.g., power island, processor, various modules such as processing modules, digital BB receiver or transmitter processing modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory, random access memory, volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. An integrated circuit, comprising:
a first processor implemented within a power island of the integrated circuit, wherein power management of the power island is independent from portions of the integrated circuit outside of the power island; and
a second processor implemented outside of the power island of the integrated circuit; and wherein:
during boot up of the integrated circuit, the first processor and the second processor are powered on and the first processor boots up from a first boot sector;
after a period of time has passed, the first processor powers down, and the second processor remains powered and operational; and
in response to an interrupt request, the first processor is powered on and booted up from a second boot sector.

2. The integrated circuit of claim 1, wherein:
the first boot sector is located in a first location of the integrated circuit;
the second boot sector is located in a second location of the integrated circuit; and
the first boot sector is cloaked after the first processor powers down.

3. The integrated circuit of claim 1, wherein:
after the period of time has passed, the first processor stores a state of the first processor before powering down; and
in response to the interrupt request, the first processor is powered on and booted up from a second boot sector such that the first processor returns to the state of the first processor before powering down.

4. The integrated circuit of claim 1, wherein:
after the period of time has passed, the first processor stores an endian by which data is interpreted by the first processor before powering down; and
in response to the interrupt request, the first processor is powered on and booted up from a second boot sector such that the first processor employs the stored endian to interpret data.

5. The integrated circuit of claim 1, wherein:
the first processor is a main application processor; and
the second processor is a baseband processor.

6. The integrated circuit of claim 1, wherein:
the first processor is implemented using circuitry having higher leakage than circuitry with which the second processor is implemented.

7. The integrated circuit of claim 1, wherein:
after the period of time has passed, the first processor powers down based on a software request that corresponds to a completion of a predetermined task by the first processor.

8. The integrated circuit of claim 1, wherein:
based on a fluctuation of voltage that powers the power island, the power island of the integrated circuit performs a power on reset that shuts down the first processor.

9. The integrated circuit of claim 1, wherein:
the integrated circuit is implemented within a wireless communication device; and
the interrupt request is at least one of an incoming call to the wireless communication device or a pressing of a key of the wireless communication device.

10. The integrated circuit of claim 1, wherein:
the integrated circuit is implemented within a wireless communication device.

11. An integrated circuit, comprising:
a first processor implemented within a power island of the integrated circuit, wherein power management of the power island is independent from portions of the integrated circuit outside of the power island; and
a second processor implemented outside of the power island of the integrated circuit; and wherein:
during boot up of the integrated circuit, the first processor and the second processor are powered on and the first processor boots up from a first boot sector;
after a period of time has passed, the first processor stores a state of the first processor and subsequently powers down, and the second processor remains powered and operational;
in response to the interrupt request, the first processor is powered on and booted up from a second boot sector such that the first processor returns to the state of the first processor before powering down;
the first boot sector is located in a first location of the integrated circuit;
the second boot sector is located in a second location of the integrated circuit;
the first boot sector is cloaked after the first processor powers down; and
the first processor is implemented using circuitry having higher leakage than circuitry with which the second processor is implemented.

12. The integrated circuit of claim 11, wherein:
after the period of time has passed, the first processor stores an endian by which data is interpreted by the first processor before powering down; and
in response to the interrupt request, the first processor is powered on and booted up from a second boot sector such that the first processor employs the stored endian to interpret data.

13. The integrated circuit of claim 11, wherein:
after the period of time has passed, the first processor powers down based on a software request that corresponds to a completion of a predetermined task by the first processor.

14. The integrated circuit of claim 11, wherein:
based on a fluctuation of voltage that powers the power island, the power island of the integrated circuit performs a power on reset that shuts down the first processor.

15. The integrated circuit of claim 11, wherein:
the integrated circuit is implemented within a wireless communication device; and
the interrupt request is at least one of an incoming call to the wireless communication device or a pressing of a key of the wireless communication device.

16. A method for performing power management within an integrated circuit, the method comprising:
powering a power island of the integrated circuit independently from portions of the integrated circuit outside of the power island, wherein the power island includes a first processor, the integrated circuit includes a second processor implemented outside of the power island of the integrated circuit, and the first processor is implemented using circuitry having higher leakage than circuitry with which the second processor is implemented;
during boot up of the integrated circuit, powering up the first processor and the second processor, and booting up the first processor from a first boot sector that is located in a first location of the integrated circuit;
after a period of time has passed, powering down the first processor, cloaking the first boot sector, and continuing to power the second processor such that the second processor remains operational; and in response to an interrupt request, powering on the first processor and booting up the first processor from a second boot sector that is located in a second location of the integrated circuit.

17. The method of claim 16, further comprising:
after the period of time has passed, storing a state of the first processor before powering down the first processor; and
in response to the interrupt request, powering on the first processor and booting up the first processor from a second boot sector such that the first processor returns to the state of the first processor before powering down.

18. The method of claim 16, wherein:
after the period of time has passed, storing an endian by which data is interpreted by the first processor before powering down; and
in response to the interrupt request, powering on the first processor and booting up the first processor from a second boot sector such that the first processor employs the stored endian to interpret data.

19. The method of claim 16, further comprising:
based on a fluctuation of voltage that powers the power island, performing a power on reset of the power island of the integrated circuit to shut down the first processor.

20. The method of claim 16, wherein:
the integrated circuit is implemented within a wireless communication device.

\* \* \* \* \*